United States Patent Office.

EDWARD SCHARNIKOW, OF MARGARETTVILLE, NEW YORK.

Letters Patent No. 106,875, dated August 30, 1870; antedated August 19, 1870.

IMPROVED COMPOUND OR "ROUGH STUFF" TO BE APPLIED TO CARRIAGE-BODIES, &c.

The Schedule referred to in these Letters Patent and making part of the same

*To all whom it may concern:*

Be it known that I, EDWARD SCHARNIKOW, of Margarettville, in the county of Delaware and State of New York, have invented a new and improved Compound for "Rough Stuff;" and I do hereby declare the following to be a full, clear, and exact description thereof, which will enable those skilled in the art to make and use the same.

This invention relates to a compound which is technically known as rough stuff, and which is applied to carriages, car-bodies, and other articles to be varnished, previous to the application of the coat of varnish, for the purpose of producing a smooth surface for the reception of the varnish.

My compound is made of brown clay, prepared linseed-oil, varnish, and japan, which ingredients are mixed together in about the following proportion:

Brown clay, five parts; prepared linseed-oil, one part; varnish, one part; japan, three parts.

The clay is cleaned from all impurities by washing, and the linseed-oil is prepared with litharge, amber, red lead, and sugar of lead, in the following manner:

To five gallons of linseed-oil I add half a pound of litharge, half a pound of amber, half a pound of red lead, and a quarter pound sugar of lead, and boil the mixture twice, so as to produce a homogeneous mass.

After having prepared the clay and the linseed-oil, I mix them together with hard-drying varnish and japan, in about the proportion above stated, and I obtain a rough stuff which, when applied to the article to be varnished, produces a perfectly smooth and level surface, and which is elastic and very durable, so that it is not liable to crack or flake off. It does not absorb the varnish, and produces a brilliant finish, and it saves time, labor, and expense.

What I claim as new, and desire to secure by Letters Patent, is—

A compound for rough stuff, made of the ingredients herein set forth, and mixed together about in the proportion and in the manner above described.

This specification signed by me this 22d day of January, 1870.

EDWARD SCHARNIKOW.

Witnesses:
C. GRESIUCHNA,
W. HAUFF.